2,790,818
Patented Apr. 30, 1957

2,790,818

CYANOETHYLATION OF ORGANIC SULFUR COMPOUNDS

Glen E. Journeay, Texas City, Tex., assignor to Monsanto Chemical Company, St. Louis, Mo., a corporation of Delaware No Drawing. Application September 23, 1954, Serial No. 458,021

17 Claims. (Cl. 260—464)

This invention relates to cyanoethylated organic sulfur compounds and to a process for producing them.

It has been found in accordance with the invention that sulfhydryl compounds of the formula RSH, where R may be an organic radical such as an alkyl, cycloalkyl, alkenyl, aryl, aralkyl, alkaryl, or derivatives thereof, may be reacted with $\beta,\beta'$-oxydipropionitrile in the presence of a strongly alkaline catalyst. The reaction appears to be a general one for any organic compound containing a mercapto group or capable of existing as a form having a free mercapto group. By the reaction, a $\beta$-cyanoethyl group replaces the H atom in the mercapto group. The products are valuable as intermediates in the preparation of the corresponding acids and amines, in the manufacture of dyestuffs, artificial materials and medicines, and are useful as insecticides.

The reaction is applicable to a wide variety of mercapto or thiol compounds of the aliphatic, cycloaliphatic, arylaliphatic and the aromatic series. The compounds employed may contain other functional groups than the mercapto grouping so long as they do not react with the alkaline catalyst. For example, these groups may be chloro, bromo, acyl, alkoxy, aryloxy, carbalkoxy, carbamyl, cyano and the like. Among the many typical sulfhydryl compounds which are suitable for the purpose of this invention may be mentioned the following: the alkyl mercaptans, or as they are more correctly termed, the alkane thiols, such as methanethiol, ethanethiol, 1-propanethiol, 2-propanethiol, 1-butanethiol, dodecanethiol, and the like; cycloaliphatic compounds such as cyclopentanethiol, methylcyclopentanethiol, cyclohexanethiol, methylcyclohexanethiol, and the like; alkenyl compounds such as 2-propene-1-thiol, 2-butene-1-thiol, and 3-butene-1-thiol; aryl and alkaryl compounds such as benzenethiol, 2-, 3-, and 4-ethylbenzenethiol, 2-, 3-, and 4-propylbenzenethiol, $\alpha$-toluenethiol, 3-, 2-, and 4-toluenethiol, 1- and 2-naphthalenethiol, 2,4-xylenethiol, 2,5-xylenethiol; aralkyl compounds such as 2-phenylethanethiol, 3-phenyl-1-propanethiol, 3-phenyl-2-propanethiol, 4-phenyl-1-butanethiol; other derivatives such as 2-methoxybenzenethiol, 2-(2-chloroethyl)benzenethiol, 3-chloro-2-toluenethiol, acetylmethanethiol, 3-phenoxy-2-propanethiol, 2-bromo-3-butene-1-thiol, 1-ethoxyethanethiol, acetylcyclohexanethiol, methyl-2-naphthalenethiol, and the like.

The strongly alkaline catalysts which are effective for promoting the reaction are the oxides, hydroxides, carbonates, phosphates, cyanides, amides and alcoholates of the alkali metals or the alkali metals themselves. Included in this category are, for example, sodium hydroxide, potassium hydroxide, lithium hydroxide, sodium oxide, sodamide, potassium ethylate, sodium cyanide, potassium carbonate, potassium tertiary amylate, and the like. Also suitable are the strongly basic non-metallic hydroxides such as the quaternary ammonium hydroxides among which may be mentioned trimethylbenzylammonium hydroxide (available commercially under the trade name of "Triton B"), benzyltriethylammonium hydroxide, dimethyldibenzylammonium hydroxide, and the like.

The quantity of alkaline catalyst required is relatively small, amounts in the range from about 0.1% to about 20% of the combined weights of the reactants being required. In practice, amounts ranging from about 1% to about 10% are preferred.

The reaction is carried out most conveniently by adding the $\beta,\beta'$-oxydipropionitrile to the alkaline solution of the mercaptan or thiol. This procedural step is not essential, however, since the order of addition of the reactants, or the stage of the process at which the catalyst is added are not critical. All reactants may be charged to the reactor simultaneously, or good results may be secured by adding the alkaline catalyst to a mixture of the reagents, or by adding both the thiol and the oxydipropionitrile to a medium containing the catalyst. In the latter case, the medium may be an inert solvent such as hexane, dioxane, benzene, petroleum ether, or tert.-butyl alcohol, or like materials.

The cyanoethylation of thiols takes place readily at temperatures from about 0° C. upwards to about 150° C. Preferably, the temperature is maintained in the range from about 25° C. to about 100° C. Atmospheric pressure is usually employed but pressures in excess of atmospheric may be used in cases where the process may be operated more efficiently under presure. This may be true, for example, where the thiol or mercaptan reactant is very low boiling as in the case of methanethiol (boiling point ~5° C.) where the use of a pressurized system precludes loss of the volatile reactant.

Stoichiometric quantities of the reactants may be employed. However, an excess of $\beta,\beta'$-oxydipropionitrile is ordinarily used. The preferred mole ratio of $\beta,\beta'$-oxydipropionitrile to thiol is in the range from 2:1 to 5:1.

The following examples are given only to illustrate the invention and are not intended to limit it in any manner except as it is limited by the appended claims. All parts are by weight.

Example I

A mixture consisting of 10.4 parts of $\beta,\beta'$-oxydipropionitrile, 8.59 parts of dodecanethiol (dodecyl mercaptan), and 0.28 part of potassium hydroxide dissolved in 200 parts of isopropyl alcohol was allowed to stand for one hour at room temperature (25° C.). At the end of this time, 98% of the dodecanethiol had been consumed to produce $\beta$-(dodecyl)mercaptopropionitrile.

Example II

Sixty-two parts of ethanethiol (one mole), five parts of sodium hydroxide and 500 parts of tert.-butyl alcohol are charged to a container of suitable capacity fitted with a stirrer and a reflux condenser. Substantially 430 parts (approximately 5 moles) of $\beta,\beta'$-oxydipropionitrile are added and the reaction mixture is allowed to reflux for a period of from about 3 to about 5 hours. The reaction mixture is cooled, the oily product is drawn off, extracted in an ether or some other suitable solvent, washed free of alkali, and dried. The product, solvent, and unreacted β,β'-oxydipropionitrile are separated by fractional distillation and a fraction consisting of β-ethylmercaptopropionitrile in good yield is obtained.

*Example III*

Approximately 116 parts of cyclohexanethiol, 700 parts of β,β'-oxydipropionitrile and 10 parts of sodium hydroxide are charged to a reactor of suitable capacity and heated to a temperature of 80° C. The reaction mixture is stirred at this temperature for about three hours. The oily product is drawn off, dissolved in ether or other solvent, and the solvent extracts are washed free of alkali and dried over calcium chloride. The solvent is evaporated and the residue distilled under reduced pressure to recover a good yield of cyclohexylmercaptopropionitrile.

*Example IV*

Substantially 550 parts of β,β'-oxydipropionitrile is added to a stirred charge consisting of 110 parts of benzenethiol (thiophenol) and approximately 13 parts of trimethylbenzylammonium hydroxide. The temperature of the reaction mixture is maintained between 80 and 100° C. and stirring is continued for from three to five hours after the nitrile is added. The oil is then separated, washed, dried, and distilled to recover a fraction consisting of β-phenylmercaptopropionitrile in good yield.

The foregoing procedure is repeated substituting 125 parts of 2-toluenethiol (ortho-thiocresol) for benzenethiol and sodium hydroxide for the trimethylbenzylammonium hydroxide. A colorless oil consisting essentially of β-(ortho-tolyl)mercaptopropionitrile is recovered in comparable yield.

*Example V*

A mixture of 710 parts of β,β'-oxydipropionitrile and 153 parts of 3-phenyl-1-propanethiol is heated at a temperature of approximately 80° C. for from eight to ten hours in a suitable reactor which has been charged with a solution of 10 parts of sodamide in 500 parts of tert-butyl alcohol. The 3-phenyl-propyl-2'-cyanoethyl sulfide thus formed in good yield may be obtained in a pure state by fractional distillation of the oily reaction product after it has been separated from the reaction mixture, washed, and dried.

*Example VI*

To a solution of 37 parts of 2-propene-1-thiol in 300 parts of dioxane there is added about 5 parts of potassium hydroxide. The mixture is stirred at room temperature while about 355 parts of β,β'-oxydipropionitrile is gradually added thereto. The mixture is then stirred for several hours longer while the temperature is raised to about 50° C. and maintained at that level. A good yield of β-(2-propenyl)mercaptopropionitrile is obtained by working up the reaction mixture as described in the above examples.

*Example VII*

According to the procedure outlined in Example II, 51 parts (0.5 mole) of 1-ethoxyethanethiol is reacted with approximately 215 parts of β,β'-oxydipropionitrile in the presence of about 4 parts of sodium cyanide and there is recovered from the reaction mixture 2-(1-ethoxyethyl)-mercaptopropionitrile.

*Example VIII*

In a manner similar to that described in Example IV, 2-(2-chloroethyl)phenylmercaptopropionitrile is produced by reacting 50.8 parts (0.3 mole) of 2-chloroethylbenzenethiol with 127.8 parts (0.9 mole) of β,β'-oxydipropionitrile in the presence of 3.5 parts of sodium hydroxide.

What is claimed is:

1. A process for cyanoethylating organic sulfur compounds which comprises reacting β,β'-oxydipropionitrile with compounds having the general formula RSH, in which R represents a residue chosen from the group consisting of the alkyl, alkenyl, cycloalkyl, aryl, alkaryl and aralkyl radicals, in the presence of a strongly alkaline catalyst.

2. A process for cyanoethylating organic sulfur compounds which comprises reacting β,β'-oxydipropionitrile with compounds having the general formula RSH, in which R represents a residue chosen from the group consisting of the alkyl, alkenyl, cycloalkyl, aryl, alkaryl and aralkyl radicals, in the presence of a strongly alkaline catalyst and at a temperature from about 0° C. to about 150° C.

3. A process for cyanoethylating organic sulfur compounds which comprises reacting β,β'-oxydipropionitrile with compounds having the general formula RSH, in which R represents a residue chosen from the group consisting of the alkyl, alkenyl, cycloalkyl, aryl, alkaryl and aralkyl radicals, in the presence of a strongly alkaline catalyst and at a temperature from about 25° C. to about 100° C.

4. A process for cyanoethylating organic sulfur compounds which comprises reacting β,β'-oxydipropionitrile with compounds having the general formula RSH, in which R represents a residue chosen from the group consisting of the alkyl, alkenyl, cycloalkyl, aryl, alkaryl, and aralkyl radicals, in the presence of a strongly alkaline catalyst at a temperature from about 0° C. to about 150° C. and in quantities such that the mole ratio of β,β'-oxydipropionitrile to said sulfur compounds is in the range from 1:1 to 5:1.

5. A process for cyanoethylating organic sulfur compounds which comprises reacting β,β'-oxydipropionitrile with compounds having the general formula RSH, in which R represents a residue chosen from the group consisting of the alkyl, alkenyl, cycloalkyl, aryl, alkaryl, and aralkyl radicals, in the presence of a strongly alkaline catalyst at a temperature from about 25° C. to about 100° C. and in quantities such that the mole ratio of β,β'-oxydipropionitrile to said sulfur compounds is in the range from 1:1 to 5:1.

6. The process of claim 4 in which the strongly alkaline catalyst is the hydroxide of an alkali metal.

7. The process of claim 5 in which the strongly alkaline catalyst is the hydroxide of an alkali metal.

8. A process for cyanoethylating dodecanethiol which comprises reacting β,β'-oxydipropionitrile with dodecanethiol in the presence of a strongly alkaline catalyst.

9. A process for cyanoethylating dodecanethiol which comprises reacting β,β'-oxydipropionitrile with dodecanethiol in the presence of the hydroxide of an alkali metal, at a temperature from about 25° C. to about 100° C., in such quantities that the mole ratio of β,β'-oxydipropionitrile to dodecanethiol is in the range from 1:1 to 5:1.

10. A process for cyanoethylating ethanethiol which comprises reacting β,β'-oxydipropionitrile with ethanethiol in the presence of a strongly alkaline catalyst.

11. A process for cyanoethylating ethanethiol which comprises reacting β,β'-oxydipropionitrile with ethanethiol in the presence of the hydroxide of an alkali metal, at a temperature from about 25° C. to about 100° C., in such quantities that the mole ratio of β,β'-oxydipropionitrile to ethanethiol is in the range from 1:1 to 5:1.

12. A process for cyanoethylating cyclohexanethiol which comprises reacting β,β'-oxydipropionitrile with cyclohexanethiol in the presence of a strongly alkaline catalyst.

13. A process for cyanoethylating cyclohexanethiol which comprises reacting β,β'-oxydipropionitrile with cyclohexanethiol in the presence of the hydroxide of an alkali metal, at a temperature from about 25° C. to about 100° C., in such quantities that the mole ratio of β,β'-oxydipropionitrile to cyclohexanethiol is in the range from 1:1 to 5:1.

14. A process for cyanoethylating benzenethiol which comprises reacting β,β'-oxydipropionitrile with benzenethiol in the presence of a strongly alkaline catalyst.

15. A process for cyanoethylating benzenethiol which comprises reacting β,β'-oxydipropionitrile with benzenethiol in the presence of the hydroxide of an alkali metal, at a temperature from about 25° C. to about 100° C., in such quantities that the mole ratio of β,β'-oxydipropionitrile to benzenethiol is in the range from 1:1 to 5:1.

16. A process for cyanoethylating 1-ethoxyethanethiol which comprises reacting β,β'-oxydipropionitrile with 1-ethoxyethanethiol in the presence of a strongly alkline catalyst.

17. A process for cyanoethylating 1-ethoxyethanethiol which comprises reacting β,β'-oxydipropionitrile with 1-ethoxyethanethiol in the presence of the hydroxide of an alkali metal, at a temperature from about 25° C. to about 100° C., in such quantities that the mole ratio of β,β'-oxydipropionitrile to 1-ethoxyethanethiol is in the range from 1:1 to 5:1.

References Cited in the file of this patent
UNITED STATES PATENTS

| | | |
|---|---|---|
| 2,413,917 | Harman | Jan. 7, 1947 |
| 2,437,906 | Bruson et al. | Mar. 16, 1948 |